United States Patent
Nolan

(12) United States Patent (10) Patent No.: US 7,851,014 B2
Nolan (45) Date of Patent: Dec. 14, 2010

(54) TILTED RECORDING MEDIA WITH L10 MAGNETIC LAYER

(75) Inventor: Thomas Patrick Nolan, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 126 days.

(21) Appl. No.: 11/851,190

(22) Filed: Sep. 6, 2007

(65) Prior Publication Data

US 2008/0003354 A1 Jan. 3, 2008

Related U.S. Application Data

(63) Continuation of application No. 10/766,920, filed on Jan. 30, 2004, now Pat. No. 7,282,278.

(60) Provisional application No. 60/651,458, filed on Jul. 2, 2003.

(51) Int. Cl.
G11B 5/00 (2006.01)
G11B 5/62 (2006.01)
G11B 5/708 (2006.01)

(52) U.S. Cl. .................. 427/128; 427/127; 427/131; 427/132; 428/800; 428/842.1; 428/831.2

(58) Field of Classification Search .................. 427/128, 427/127, 131–132; 428/831.2, 800, 842.1
See application file for complete search history.

(56) References Cited

U.S. PATENT DOCUMENTS

| | | | |
|---|---|---|---|
| 4,980,875 A | 12/1990 | Ishiwata et al. | |
| 5,236,791 A | 8/1993 | Yahisa et al. | |
| 5,363,794 A | 11/1994 | Lairson et al. | |
| 5,468,670 A | 11/1995 | Ryou | |
| 5,603,766 A | 2/1997 | Visokay et al. | |
| 5,824,409 A | 10/1998 | Sellmyer et al. | |
| 5,989,728 A | 11/1999 | Coffey et al. | |
| 6,007,623 A | 12/1999 | Thiele et al. | |
| 6,033,536 A | 3/2000 | Ichihara et al. | |
| 6,068,739 A * | 5/2000 | Suzuki et al. | 204/192.2 |
| 6,086,974 A * | 7/2000 | Thiele et al. | 428/832.1 |
| 6,248,416 B1 * | 6/2001 | Lambeth et al. | 428/832.2 |
| 7,468,214 B2 * | 12/2008 | Lu et al. | 428/836 |
| 2002/0041980 A1 * | 4/2002 | Suzuki et al. | 428/694 T |
| 2002/0098381 A1 | 7/2002 | Coffey et al. | |
| 2003/0215675 A1 * | 11/2003 | Inaba et al. | 428/694 TP |
| 2004/0048092 A1 * | 3/2004 | Yasui et al. | 428/642 |
| 2005/0134988 A1 * | 6/2005 | Nakamura et al. | 360/55 |
| 2006/0002026 A1 * | 1/2006 | Stipe et al. | 360/135 |
| 2007/0009766 A1 * | 1/2007 | Lu et al. | 428/836.1 |
| 2008/0050616 A1 * | 2/2008 | Lee et al. | 428/827 |

* cited by examiner

FOREIGN PATENT DOCUMENTS

WO WO 99/24973 * 5/1999

OTHER PUBLICATIONS

Jeong et al., Controlling the crystallographic orientation in ultrathin L1- FePt (111 ) films on MgO(111) underlayer, IEEE Trans Magn, vol. 37, No. 4, Jul. 2001, pp. 1268-1270.*

*Primary Examiner*—Timothy H Meeks
*Assistant Examiner*—Mandy C Louie
(74) *Attorney, Agent, or Firm*—Hollingsworth & Funk, LLC

(57) ABSTRACT

Magnetic recording media having a magnetic layer with an easy magnetization axis lying about 35° out of plane of the magnetic layer is disclosed. This media has a reduced total magnetic layer thickness and higher signal, while improving the media signal-to-noise ratio (SNR).

20 Claims, 5 Drawing Sheets

Carbon overcoat

Magnetic layer with $L1_0$ orientation

Underlayer

Substrate

Protective overcoat 23

Magnetic layer 22

Underlayer 21

Substrate 20

Underlayer 21'

Magnetic layer 22'

Protective overcoat 23'

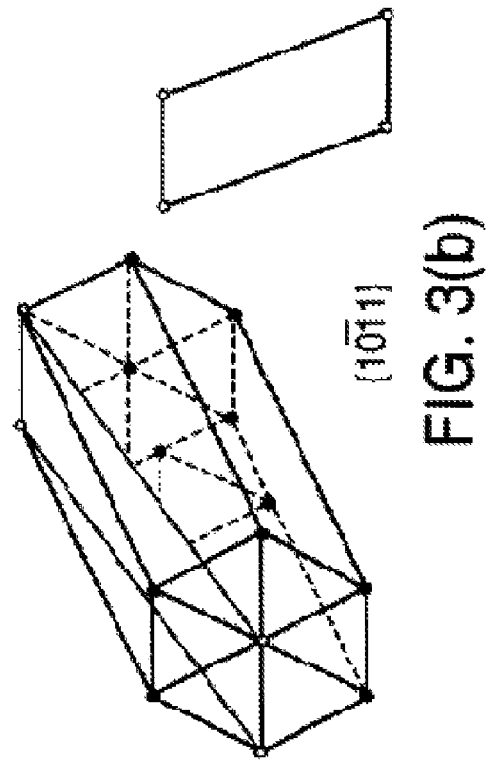
FIG. 3(a) [10$\bar{1}$0]
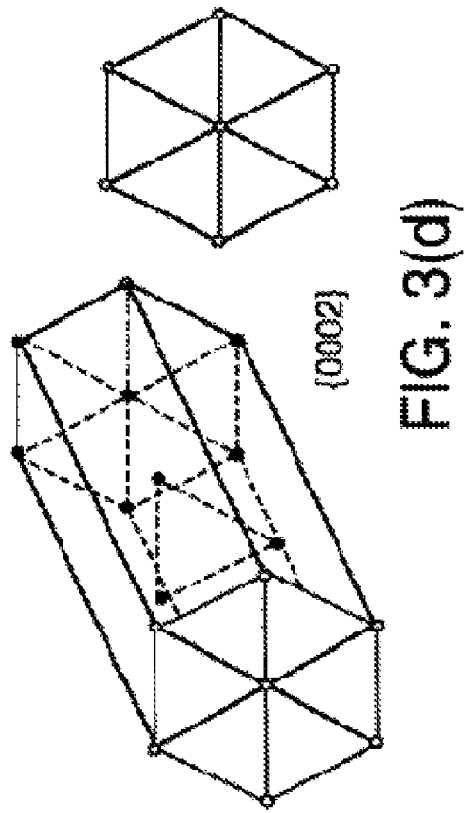
FIG. 3(b) [10$\bar{1}$1]
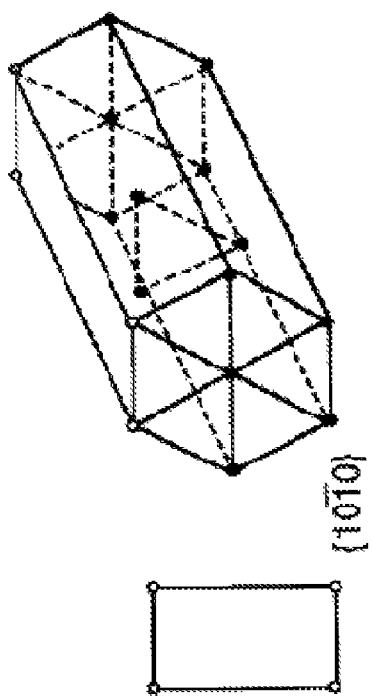
FIG. 3(c) [11$\bar{2}$0]
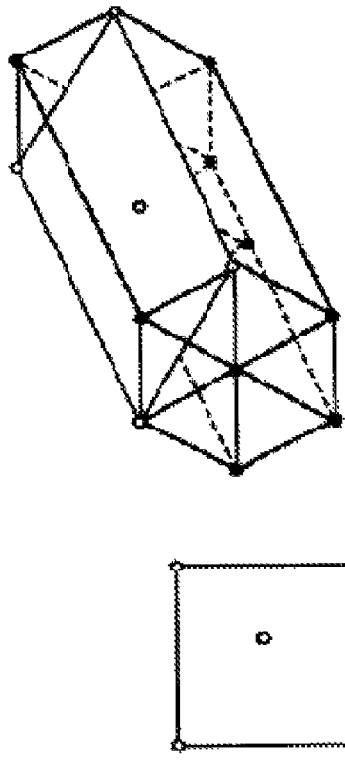
FIG. 3(d) {0002}

Carbon overcoat

Magnetic layer with $L1_0$ orientation

Underlayer

Substrate

TILTED RECORDING MEDIA WITH L10 MAGNETIC LAYER

This application is a continuation of non-provisional application Ser. No. 10/766,920, filed Jan. 30, 2004 now U.S. Pat. No. 7,282,278, now allowed, which claims benefit from Provisional Application Ser. No. 60/651,458, filed Jul. 2, 2003, the entire disclosures of the above mentioned applications are hereby incorporated herein by reference.

FIELD OF INVENTION

This invention relates to magnetic recording media, such as thin film magnetic recording disks, and to a method of manufacturing the media. The invention has particular applicability to high areal density longitudinal magnetic recording media having very low medium noise.

BACKGROUND

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

The increasing demands for higher areal recording density impose increasingly greater demands on thin film magnetic recording media in terms of coercivity (Hc), remanent coercivity (Hr), magnetic remanance (Mr), which is the magnetic moment per unit volume of ferromagnetic material, coercivity squareness (S*), signal-to-medium noise ratio (SMNR), and thermal stability of the media. These parameters are important to the recording performance and depend primarily on the microstructure of the materials of the media. For example, decreasing the grain size or reducing exchange coupling between grains, can increase SMNR, but it has been observed that the thermal stability of the media often decreases.

The requirements for high areal density, e.g., higher than 100 Gb/in$^2$, impose increasingly greater requirements on magnetic recording media in terms of coercivity, remanent squareness, medium noise, track recording performance and thermal stability. It is extremely difficult to produce a magnetic recording medium satisfying such demanding requirements, particularly a high-density magnetic rigid disk medium for longitudinal and perpendicular recording.

As the storage density of magnetic recording disks has increased, the product of Mr and the magnetic layer thickness t has decreased and Hr of the magnetic layer has increased. This has led to a decrease in the ratio Mrt/Hr. To achieve a reduction in Mrt, the thickness t of the magnetic layer has been reduced, but only to a limit because the magnetization in the layer becomes susceptible to thermal decay and medium noise.

Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (hcp) with uniaxial crystalline anisotropy and a magnetization easy direction along the c-axis that lies in the plane of the film. The better the in-plane c-axis crystallographic texture, the more suitable is the Co alloy thin film for use in longitudinal recording to achieve high remanance and coercive force. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains thereby decreasing intergranular exchange coupling. This type of microstructural and crystallographic control is typically attempted by manipulating the deposition process, and proper use of underlayers and seedlayers.

It is recognized that the magnetic properties, such as Hcr, Mr, S and SMNR, which are critical to the performance of a magnetic alloy film, depend primarily upon the microstructure of the magnetic layer, which, in turn, is influenced by the underlying layers, such as the underlayer. It is also recognized that underlayers having a fine grain structure are highly desirable, particularly for growing fine grains of hcp Co alloys deposited thereon.

For high signal to noise ratio (SNR) magnetic recording media, it is desirable to have a high signal in a very thin film. Higher signal can be achieved by increasing the saturation magnetization (Ms) of the material at the top of the magnetic layer, and correspondingly increasing the fringing magnetic field that provides signal. Prior art magnetic recording systems generally employ media including a magnetic layer alloy including Co and Cr, and other elements often including Pt, and B. These magnetic layer systems generally require 10-25% Cr, and often use 5-15% B in order to isolate the magnetic grains in the magnetic layer and reduce noise.

There exists a continuing need for high areal density magnetic recording media exhibiting high Hcr and high SMNR while overcoming the deficiencies of the prior art solutions. In general, tilted recording is expected to overcome the deficiencies of the prior art because the head writes more efficiently at tilt, and the head should thus be able to use higher Hc media. L1$_0$ tilted is a high Hc tilted media.

SUMMARY OF THE INVENTION

The invention relates to a recording medium and method of manufacturing the medium. The media comprises a magnetic layer comprising a magnetic material comprising an ordered, face-centered tetragonal (fct) L1$_0$ structure having a c-axis of the fct L1$_0$ structure magnetic layer at an angle, canted about 35° out-of-plane of the magnetic layer. Current recording media designs utilize magnetization with easy axis either in the disk plane (longitudinal recording) or perpendicular to the disk plane (perpendicular recording) for storing data. This invention produces a recording media with the easy magnetization axis lying about 35° tilted out of plane. Thus, media SNR could be greatly improved from conventional longitudinal and perpendicular recording, because of an increase in the grain anisotropy that could be effectively written due to the angled recording configuration. A media structure design to achieve this tilted magnetization configuration is disclosed.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 3 shows crystal textures of a hexagonal closed packed structure.

DETAIED DESCRIPTION

Figure 1:
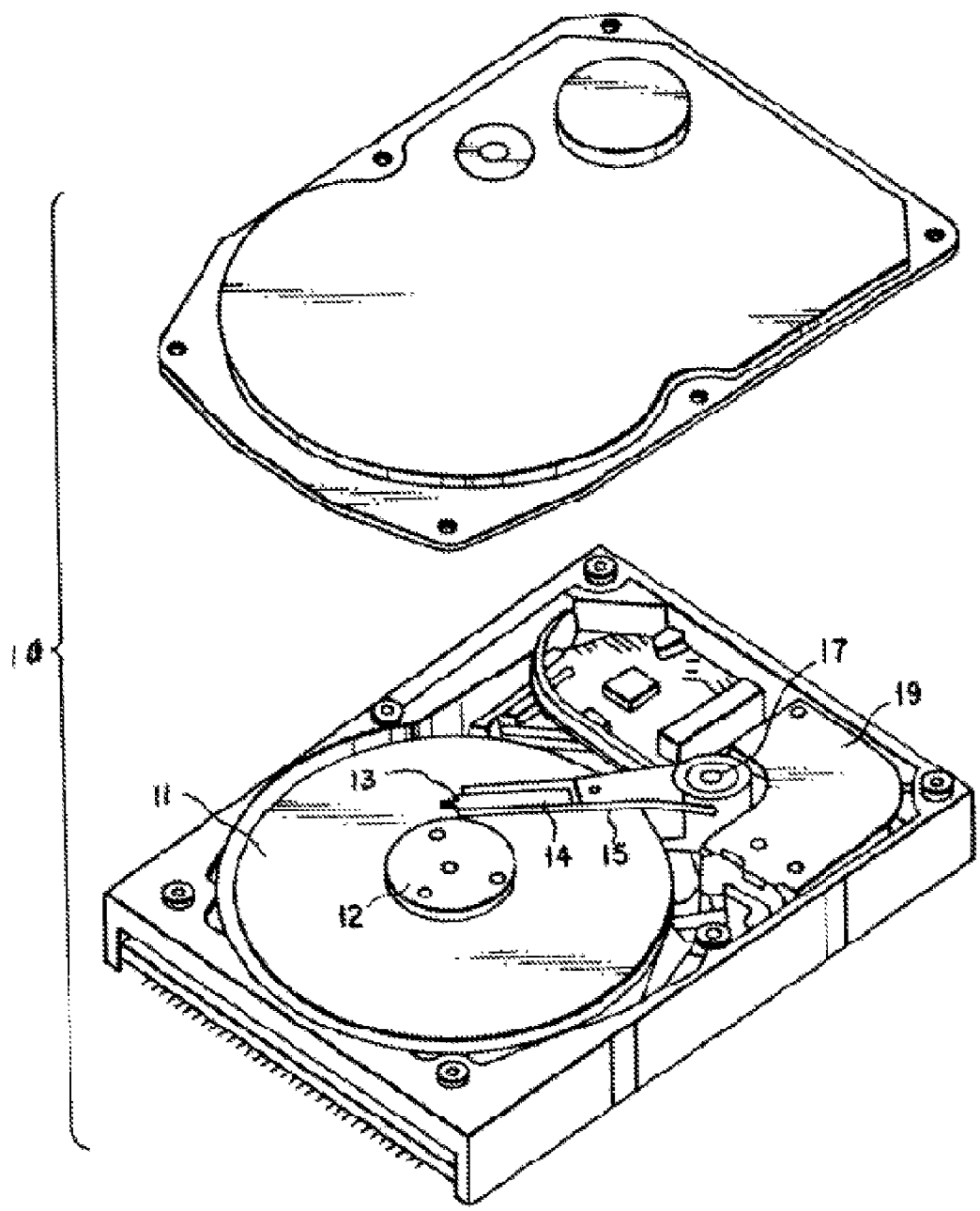
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

Figure 2:
FIG. 2 is a schematic representation of the film structure in accordance with a magnetic recording medium of the prior art.

A cross sectional view of a longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. General practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by techniques normally comprises polycrystallites epitaxially grown on the polycrystal Cr or Cr-containing underlayer.

A longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Methods for manufacturing a longitudinal magnetic recording medium with a glass, glass-ceramic, Al or Al—NiP substrate may also comprise applying a seed layer between the substrate and underlayer. A seed layer seeds the nucleation of a particular crystallographic texture of the underlayer. A seed layer is the first deposited layer on the non-magnetic substrate. The role of this layer is to texture (alignment) the crystallographic orientation of the subsequent Cr-containing underlayer.

The seed layer, underlayer, and magnetic layer are conventionally sequentially sputter deposited on the substrate in an inert gas atmosphere, such as an atmosphere of argon. A carbon overcoat is typically deposited in argon with nitrogen, hydrogen or ethylene. Lubricant topcoats are typically about 20 Å thick.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

Longitudinal magnetic recording media having Cr(200) and Co(11.0) preferred orientations are usually referred as bi-crystal media, and are commonly used in the industry. Here, Cr(200) refers to bcc (body centered cubic) structured Cr-alloy underlayer or B2-structured underlayer with (200) preferred orientation. Typical bi-crystal media comprise Cr-containing alloy underlayers and Co-alloy magnetic layers. Cr-containing alloy has body centered cubic crystalline structure. Uni-crystal media, which have Co(10.0) preferred orientations and randomly oriented media have also been used. Perpendicular magnetic recording media having Co<0002> preferred orientation are also being used. All of these media types typically have at least one small grain, hcp Co-alloy magnetic layer with low exchange coupling.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I-III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

Signal to noise ratio (SNR) of magnetic recording can be improved by increasing the maximum media coercivity for which a head can write magnetic transitions onto the media. It has been proposed that media can be written at much higher coercivity when having magnetic grains with magnetic easy axis at an angle tilted near 45° away from the applied magnetic field. It is thus desirable to form high anisotropy magnetic recording media with easy axis tilted off of the film growth normal by a uniform amount, preferably near 45°.

This invention provides magnetic recording media suitable for high areal recording density exhibiting high thermal stability and high SMNR. This invention achieves such technological advantages by using high anisotropy compositionally ordered, face-centered tetragonal (fct) $L1_0$ structures such as CoPt, FePt, CoPd, FePd and their alloys. These materials have their easy axis parallel to the long c-axis of the cubic structure, <001> and grow with the c-axis in-plane for longitudinal recording or out-of-plane for perpendicular recording. In this invention, these materials and similar materials are utilized such that the c-axis of the fct $L1_0$ structure of the magnetic layer is oriented at an angle, canted about 35° out-of-plane. Some embodiments of the invention enable tilted magnetic recording of high coercivity magnetic media by a perpendicular recording head.

Figure 4A:
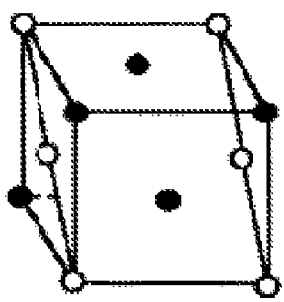
FIG. 4 shows crystal textures of a face-centered cubic structure.
Figure 4B:
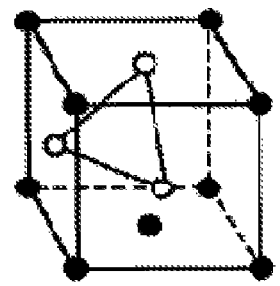
Figure 4C:
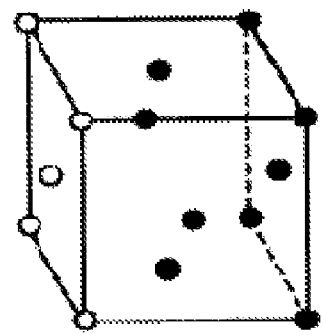

The hexagonal closed packed (hcp) lattice of Co is shown in FIG. 3 with different crystal textures. FIG. 4 shows the crystal texture of a face centered cubic (fcc) structure. By using an appropriate underlayer with surface plane matching this lattice unit, an fcc layer in a <111> growth orientation or an hcp layer in a <0002> growth orientation is grown by epitaxy. The face centered cubic structure shown in FIG. 4 encompasses pure elements having a fcc structure, as well as solid solutions of those pure elements and alloys having derivative structures, such as $L1_0$ and $L1_2$, that have a unit cell analogous to the fcc unit cell. As such, the use of the terms "fcc" and "fcc structure" herein should be understood to include those compositions that have a face centered cubic structure or face centered cubic derivative structure, unless otherwise stated.

In this application, word "containing" means that the layer comprises the elements or compounds before the word "containing" but the layer could still include other elements and compounds.

The Co-containing magnetic layer can comprise any Co-based alloy such as CoCrPt, CoCrPtTa, CoCrPtTaNb, and CoCrPtB. The magnetic layer can be single magnetic layer or dual magnetic layers immediately adjacent to each other.

In a variation, there could further be seedlayer(s) of about 1.0 nm to about 160 nm thickness below this underlayer to nucleate growth for Al, glass or other substrate. A portion of the seed layer(s) and/or the underlayer(s) could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

The carbon overcoat could be further coated with a lubricant layer generally 1 nm to 3 nm thick. The lubricant is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include Al, glass, glass-ceramic, plastic/polymer material, ceramic, glass-polymer or composite materials.

Desirably, the lattice constant and the crystal plane of the seedlayer(s), if used, should closely match that of the seed layer. Similarly, matching between other layers, except with carbon overcoat, is also desirable. As a consequence of lattice and crystalline plane matching, the magnetic layer, in turn, will grow in a close-packed hexagonal structure with a Co{11.0} crystallographic planes predominantly parallel to the film plane, with the magnetic easy axis, c-axis, lying predominantly in the film plane.

In a preferred embodiment, the thickness of the optional seed layer could be about 10 Å to about 1600 Å. The thickness of this varying underlayer could be about 10 Å to about 500 Å, preferably between about 20 Å and about 100 Å, and most preferably between about 25 Å and about 50 Å. The thickness of the magnetic layer could be about 60 Å to about 300 Å, preferably between about 80 Å and about 200 Å, and most preferably about 100-190 Å. The thickness of the intermediate layer between this underlayer and Co-containing magnetic layer, if used, could be about 10 Å to about 60 Å, preferably between about 15 Å and about 50 Å, and most preferably about 20-25 Å. The thickness of the protective layer could be about 20 Å to about 300 Å, preferably between about 20 Å and 100 Å, and most preferably about 30 Å. The protective layer could be made of hydrogenated carbon, nitrogenated carbon, hybrid carbon, or a combination of them.

The magnetic recording medium has a remanent coercivity of about 3000 to about 10,000 Oersted, and an Mrt (product of remanance, Mr, and magnetic layer thickness, t) of about 0.2 to about 2.0 memu/cm². In a preferred embodiment, the coercivity is about 3500 to about 7000 Oersted, more preferably in a range of about 4000 to about 6000 Oersted, and most preferably in a range of about 4000 to about 5000 Oersted. In a preferred embodiment, the Mrt is about 0.25 to about 1 memu/cm², more preferably in a range of about 0.3 to about 0.6 memu/cm², and most preferably in a range of about 0.3 to about 0.45 memu/cm².

EXAMPES

The examples relate to a method and apparatus for a magnetic recording media with a magnetic layer having high Ms and low noise. All samples described in this disclosure could be fabricated by sputtering such as CVD, ion beam, or DC magnetron sputtering.

Figure 5:
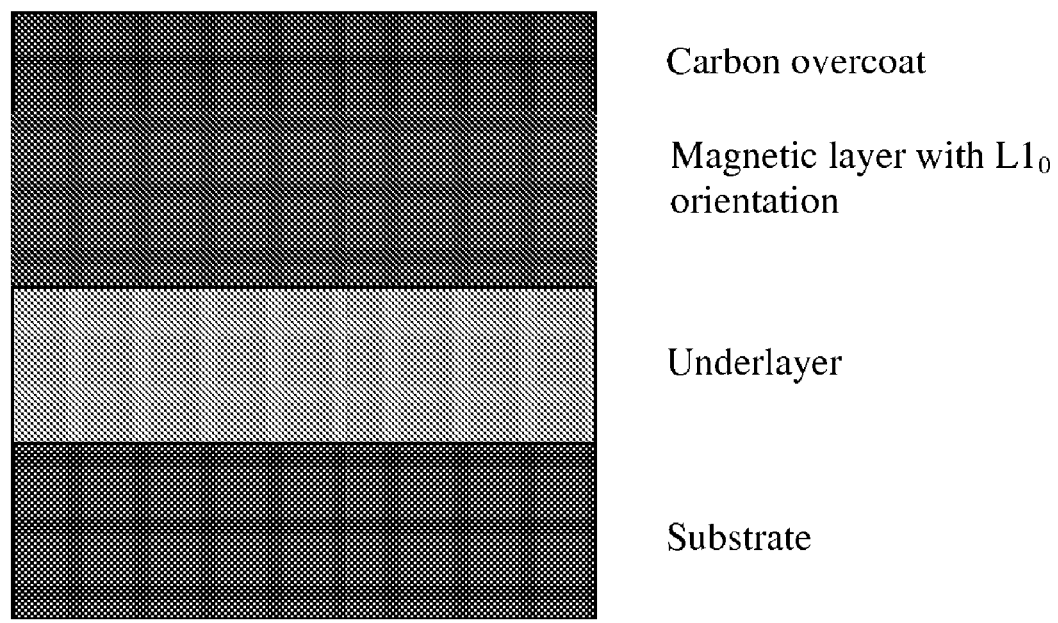
FIG. 5 shows an embodiment of the film structure according to the current invention.

An example of the film structure of the magnetic recording media in accordance with the present invention is shown in FIG. 5. In one embodiment an hcp layer having a {0002} lattice parameter and a <0002> growth orientation is deposited upon an amorphous metallic underlayer on a substrate. An example of such a structure is an Ru alloy deposited upon an amorphous TiCr alloy. A material having a {111} lattice parameter similar to said {0002} lattice parameter, and capable of having an ordered $L1_0$ structure is deposited with a <111> growth orientation. Examples of such materials are substantially equiatomic CoPt, FePt, CoPd, and FePd alloys. Such materials may be deposited as a single layer or a multilayer of disparate composition such as single elements. The canted $L1_0$ structure is then formed by annealing, so that the magnetically easy $L1_0$ <001> direction is tilted away from the prior vertical fcc <111> growth direction.

In a second embodiment an fcc layer having a first {111} lattice parameter and a <111> growth orientation is deposited upon an amorphous metallic underlayer on a substrate. An example of such a structure is one of an Ag, Pt, and a Pd alloy deposited upon an amorphous TiCr alloy. A material having a second {111} lattice parameter similar to said first {111} lattice parameter, and capable of having an ordered $L1_0$ structure is deposited with a <111> growth orientation. Examples of such materials are substantially equiatomic CoPt, FePt, CoPd, and FePd alloys. Such materials may be deposited as a single layer or a multilayer of disparate composition such as single elements. The canted $L1_0$ structure is then formed by annealing, so that the magnetically easy <001> direction is tilted away from the vertical <111> direction.

In these examples, the planes of the underlayer match very well with the planes of the $L1_0$ structure with less than 10%, in most cases, less than 6% mismatch. Also, the magnetic layer according to one these examples contains more than about two-third grains having $L1_0$ structure, the remaining grains having an fcc structure. In other embodiments, the magnetic layer contains more than 75% grains having $L1_0$ structure, the remaining grains having an fcc structure. Preferably, the magnetic layer should contain more than 85% to 95% grains having $L1_0$ structure, the remaining grains having an fcc structure. Preferably "substantially all" grains are oriented.

The steps for manufacturing the media are: (1) Depositing an underlayer for $L1_0$ growth, having a basal plane lattice parameter similar to the {111} lattice parameter of the $L1_0$ magnetic layer to be used orienting underlayer(s) on a substrate. (2) Depositing an alloy required for $L1_0$ structure, with a <111> growth orientation to form a magnetic layer. $L1_0$ structure generally requires nearly equiatomic alloys or mixtures where half of the atoms take "A" sites and the other half take "B" sites. Such mixtures include $Fe_{25}Co_{25}Pt_{50}$ or $Fe_{50}Pt_{40}Pd_{10}$. This is the ordering process. (3) Annealing as necessary to form $L1_0$ ordered structure, with <001> axis canted at about 55° away from the <111> growth orientation.

(4) Depositing a protective overcoat. The annealing temperature would be in the range of about 400-1,400° C., preferably about 500-600° C. Annealing time could vary from 10 seconds to 12 hours, preferably for shorter times to increase throughput The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations that can be practiced throughout the disclosed numerical ranges. Finally, the entire disclosure of the patents and publications referred in this application are hereby incorporated herein by reference.

The invention claimed is:

1. A method of manufacturing a magnetic recording medium comprising (a) depositing an underlayer comprising an underlayer material having a hexagonal-closed-packed (hcp) or face-centered-cubic (fcc) lattice structure with a <0002> or <111> growth orientation on a substrate and (b) depositing a magnetic layer comprising grains on said underlayer wherein (1) at least two-thirds or more of said grains have a fct $L1_0$ lattice structure having a c-axis that is at an angle, canted out of plane of the magnetic layer, and (2) said underlayer has substantially no material having $L1_0$ lattice structure.

2. The method of claim 1, wherein said magnetic layer is annealed to form the fct $L1_0$ lattice structure.

3. The method of claim 1, wherein the c-axis is canted about 35° out-of-plane of the magnetic layer.

4. The method of claim 2, wherein the c-axis is canted about 35° out-of-plane out-of-plane of the magnetic layer.

5. The method of claim 1, wherein the lattice structure of the underlayer material substantially matches the fct $L1_0$ lattice structure of the grains of the magnetic layer.

6. The method of claim 5, wherein a mismatch between the lattice structure of the underlayer material and that of the fct $L1_0$ lattice structure of the grains of the magnetic layer is less than 10%.

7. The method of claim 1, wherein the underlayer is directly in contact with the magnetic layer.

8. The method of claim 2, wherein the magnetic material is an alloy having a <111> growth orientation and is selected the group consisting of substantially equiatomic CoPt, FePt, CoPd and FePd.

9. The method of claim 1, wherein the underlayer material is a Ru alloy, an Ag alloy, a Pt alloy, or a Pd alloy.

10. The method of claim 9, wherein the underlayer is on an amorphous TiCr alloy.

11. A method of manufacturing a magnetic recording medium comprising (a) depositing a magnetic layer comprising grains and (b) depositing an underlayer comprising an underlayer material having a hexagonal-closed packed (hcp) lattice structure with a <0002> growth orientation, where the magnetic layer is deposited on said underlayer, and wherein at least two thirds or more of the grains of said magnetic layer have a derivative structure of fcc that is not a fcc lattices structure, the derivative structure having a c-axis that is at an angle, canted out of the plane of the magnetic layer.

12. The method of claim 11, wherein the underlayer has substantially no material having a $L1_0$ lattice structure and the magnetic layer precursor material is an alloy having a <111> growth orientation and is selected from the group consisting of substantially equiatomic CoPt, FePt, CoPd and FePd, and mixtures thereof.

13. The method of claim 11, wherein further comprising annealing the magnetic layer precursor to form the magnetic layer comprising fct $L1_0$ lattice structure.

14. The method of claim 11, wherein the derivative structure is a face-centered tetragonal (fct) $L1_0$ and the c-axis is canted about 35° out-of-plane of the magnetic layer.

15. The method of claim 13, wherein the c-axis is canted about 35° out-of-plane of the magnetic layer.

16. The method of claim 11, wherein the lattice structure of the close-packed planes of the underlayer material substantially matches the {111} planes of the fct $L1_0$ lattice structure of the grains of the magnetic layer.

17. The method of claim 16, wherein a mismatch between the lattice structure of the underlayer material and that of the fct $L1_0$ lattice structure of the magnetic layer is less than 10%.

18. The method of claim 11, wherein the magnetic layer is deposited directly on the underlayer.

19. A method of manufacturing a magnetic recording medium comprising (a) depositing a magnetic layer comprising grains and (b) depositing an underlayer comprising an underlayer material having a hexagonal-closed packed (hcp) or face-centered-cubic (fcc) lattice structure with a <0002> or <111> growth orientation, where the magnetic layer is deposited on said underlayer, and wherein at least two thirds or more of the grains of said magnetic layer have a derivative structure of fcc that is not a fcc lattices structure, the derivative structure having a c-axis that is at an angle, canted out of the plane of the magnetic layer, wherein the underlayer material is one of a Ru alloy, an Ag alloy, a Pt alloy, and a Pd alloy.

20. The method of claim 19, further comprising annealing the magnetic layer precursor to form the magnetic layer comprising fct $L1_0$ lattice structure.

\* \* \* \* \*